Jan. 27, 1931.    W. O. MIESSNER    1,790,278
SELECTIVE RHYTHM SOUNDER
Filed Nov. 14, 1929    2 Sheets-Sheet 1

INVENTOR.
William Otto Miessner
BY
Morsell, Keeney & Morsell
ATTORNEYS

Jan. 27, 1931. W. O. MIESSNER 1,790,278
SELECTIVE RHYTHM SOUNDER
Filed Nov. 14, 1929 2 Sheets-Sheet 2
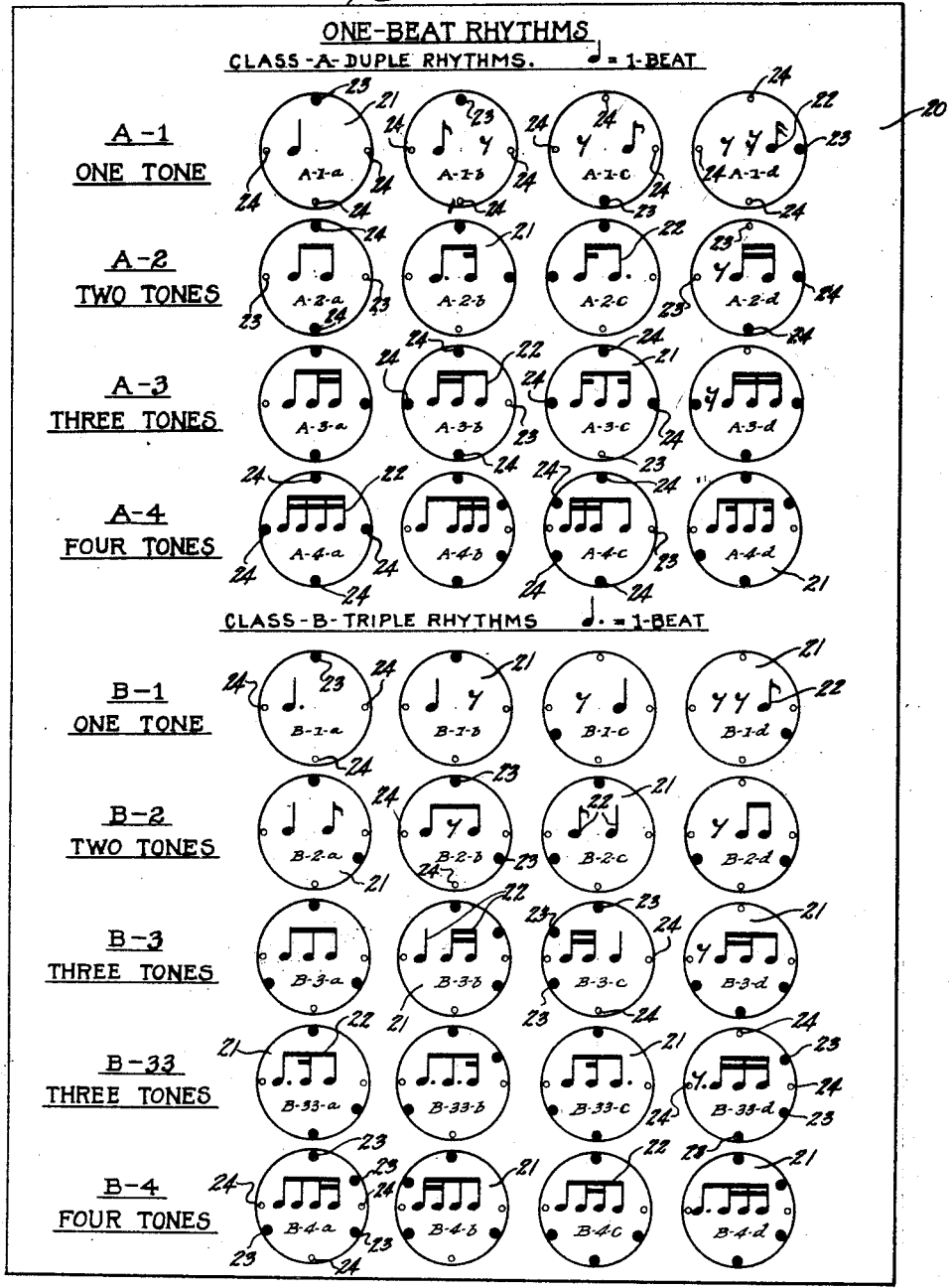

Patented Jan. 27, 1931

1,790,278

UNITED STATES PATENT OFFICE

WILLIAM OTTO MIESSNER, OF MILWAUKEE, WISCONSIN

SELECTIVE RHYTHM SOUNDER

Application filed November 14, 1929. Serial No. 407,246.

This invention relates to improvements in selective rhythm sounders.

It is extremely difficult for a student of music, or an expert musician, in practicing or learning a musical compositon, to determine and learn from the musical score, the rhythms of various phrases of the composition, especially if the rhythm or rhythms are unusual or complicated.

Basically, the expression of rhythm depends on feeling, and a musician, in order to grasp and learn a certain rhythm, must feel as well as hear the rhythm in question.

It is, therefore, the primary object of the present invention to provide a device which may be selectively arranged to impart to a person the feeling and sound of any rhythm appearing in a musical composition.

A further object of the invention is to provide a revoluble selective rhythm sounding disc and a chart therefor showing the disc arrangement for various beats by which means the beats in a musical phrase can be identified in the chart, which will show the disc arrangement for each beat so selected, whereby the arrangement of the disc will relate the tones within a beat to impart in feeling and sound the correct rhythm of the selected phrase.

A further object of the invention is to provide a selective rhythm sounder which may be applied to the ordinary phonograph without modification thereof.

A further object of the invention is to provide a selective rhythm sounder which is of very simple construction, is easily arranged and operated, is inexpensive to manufacture, is strong and durable, and is well adapted for the purposes described.

With the above and other objects in view, the invention consists of the improved selective rhythm sounder, and its parts and combinations as set forth in the claims, and all equivalents thereof.

In the accompanying drawings, in which the same reference characters indicate the same parts in all of the views:

Fig. 4 is a plan view of the chart for the improved selective rhythm sounder.

Referring now more particularly to the drawings, it will appear that the numeral 6 indicates a phonograph of ordinary construction with a revoluble record carrying plate having a central post 7.

Figure 1:
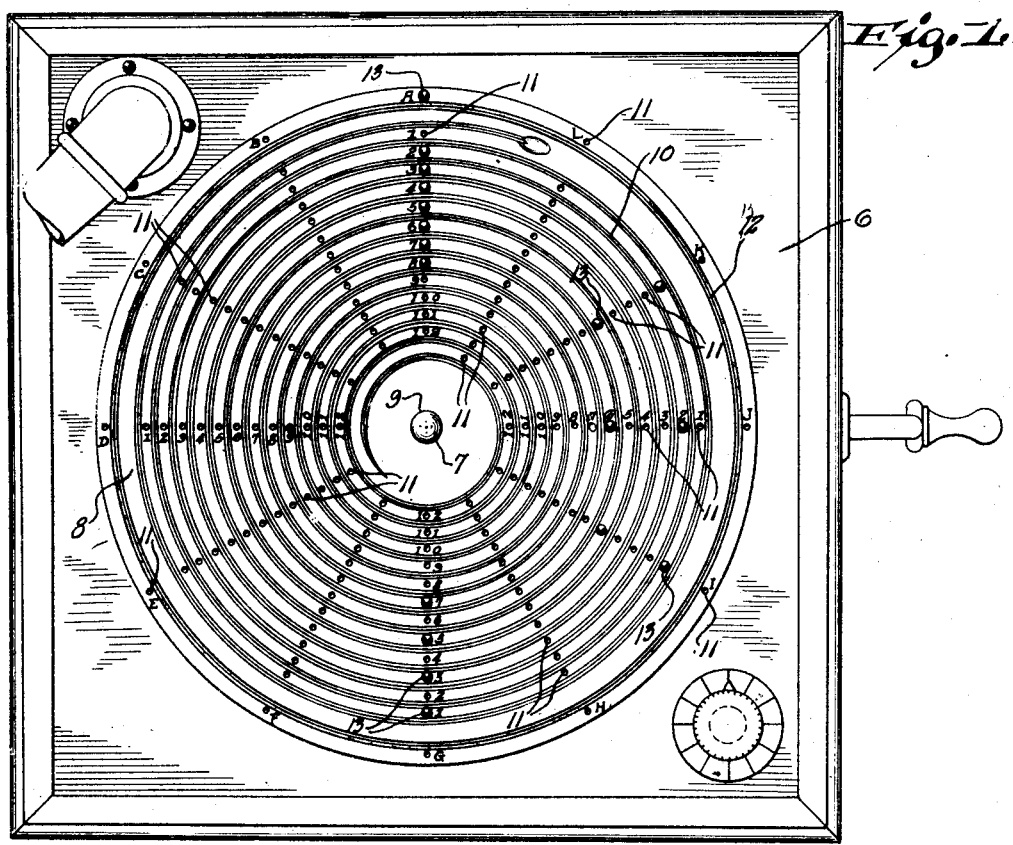
Fig. 1 is a plan view of the revoluble disc of the improved selective rhythm sounder mounted on a phonograph post and arranged to sound and impart a predetermined rhythm.

An important element of the invention is the provision of a disc 8 adapted to be positioned on and revolved by the phonograph record carrying plate and having a central opening 9 through which the post 7 extends. The upper surface of said disc, near its circumference is provided with a circular groove 12, and spaced inwardly from said groove 12 is the outer convolution of a convolute groove 10, which terminates near the mid-portion of the disc. Between the convolutions of the groove 10 and adjacent the groove 12, in radial lines, are spaced-apart apertures 11, and the radial lines of spaced apertures are separated from one another by thirty degree angles. For convenience, each radial line of apertures bears a designation, and as shown in Fig. 1 the designations range from "A" to "L" in a clock-wise direction. As will later be more fully explained there are provided for selective insertion in any or some of the various apertures 11 of the rows "A" to "L" inclusive, a plurality of small metallic pegs or brads 13 having enlarged projecting head portions.

The means for determining the arrangement of pegs 13 in various apertures 11 of the rows "A" to "L" will be more fully explained later, but assuming that an arrangement of the same has been made, as in Fig. 1, the disc is then in condition to sound and impart one rhythm or several rhythms. For this purpose a manually held resonator 14 is employed. Said resonator comprises a resonating drum-like disc 15, with a hollow interior and having a sounding wall 16 to the upper edge portion of which is secured an end portion of a spring or yielding clapper 17 which extends diametrically across the face of the sounding wall 16 and projects at its unsecured end portion beyond the edge thereof. The lower end portion of the resonator disc, laterally removed from the clapper, carries a depending needle 18. A handle 19 is secured to the wall of the resonator disc opposite the sounding wall, and said handle extends outwardly at right angles to the longitudinal plane of the clapper.

Figure 3:
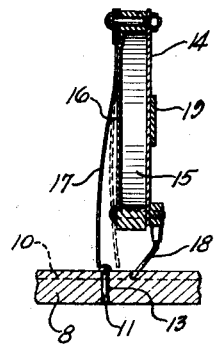
Fig. 3 is a vertical sectional view taken on line 3—3 of Fig. 2.
Figure 2:
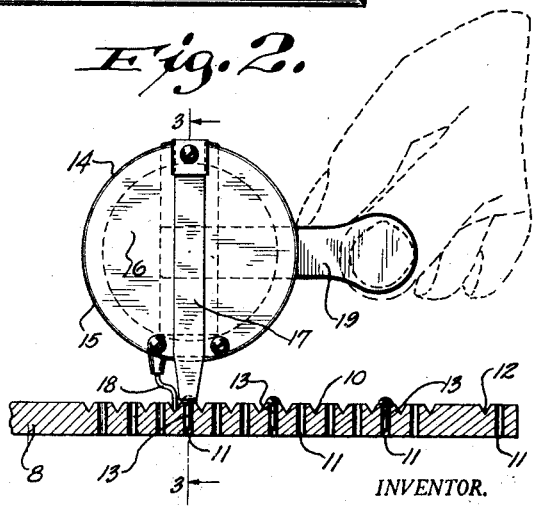
Fig. 2 is an enlarged, fragmentary vertical sectional view through a portion of the disc, showing the resonator held in position thereon.

The application of the resonator is clearly indicated in Figs. 2 and 3, wherein it will be seen that the handle portion 19 is grasped by the hand of the student or musician, and the needle 18 is lodged within either the groove 12 or the convolute groove 10 of the disc 8. Said resonator is held in a substantially upright position, and the phonograph is set into operation so that the disc 8 is revolved. The needle of the resonator will ride in the groove in which it is positioned, and as the disc revolves the head portions of the pegs 13 will engage the projecting end of the clapper and trip it so that it claps against the sounding wall 16, as shown in Fig. 3. The result is that the resonator gives out a sharp sound or beat, at each engagement of a peg, and also the beat is imparted in feeding to the holder of the resonator.

Fig. 4 illustrates a chart, designated 20, for use in connection with the rhythm sounder, and by means of the chart the student or musician is able to arrange pegs on the disc 8 to produce a predetermined rhythm embodied in a musical score which is under consideration. The chart gives disc arrangements for practically all types of one-beat rhythms and is divided into two sections, the upper half being for duple rhythms in which a quarter note equals one beat, and the lower half of the chart relates to triple rhythms in which a half note equals one beat.

Under the duple rhythms there are arranged four transverse rows of circles 21, of which the first row designates one tone, the second row designates two tones, the third row three tones, and the fourth row designates four tones. Within each circle are delineated different note symbols 22 of the general class in which a quarter note equals one beat. The periphery of each circle is divided by angularly spaced apart black dots 23 and small circles 24. The small circles indicate the major radial lines of apertures "A" to "L" on the disc 8, while the black dots indicate peg positions therein.

Under the heading "Triple rhythms" on the chart, there are five transverse rows of circles 21, which rows are designated respectively "One tone," "Two tones", "Three tones," "Three tones," and "Four tones." These circles like-wise bear note symbols 22, only the notes being such that a dotted quarter note equals one beat. Also, the peripheries of said circles are divided by angularly separated black dots 23 and small circles 24, representing respectively radial lines of apertures on the disc 8 and peg positions.

Supposing that the student finds in the sheet of music under consideration a phrase or portion thereof with a difficult rhythm, by means of the improved rhythm sounder and chart, he may easily master this rhythm by hearing and feeling the same. The first note indicias of the first beat may be similar to the indicia in the circle designated "B—33—d" of row "B—33—Three tones" of the chart. This will show that pegs should be positioned in the apertures 11 of the disc 8 adjacent the outer convolution of the groove 10 in the radial rows "G," "I" and "K." Then, he may find the note indicias of the next beat to be similar to the representation in circle "A—2—b" of row "A—2—Two tones" of the chart. This will indicate that for the next convolution of the groove 10 of the disc 8 the peg positions should be in radial lines "A" and "J" of the disc. Similarly, the representations of other beats are located on the chart, and pegs are arranged on the disc in the manner disclosed thereby.

The operator may next position the disc 8 on the phonograph, as in Fig. 1, and set it into rotation. Then, the resonator 14 is grasped, as in Fig. 2, and positioned with its needle in the outer convolution of the groove 10, and as the disc 8 rotates, the spaced pegs will be engaged by the resonator clapper, causing a sound and impulse to the holder of the resonator, and the selected rhythm is accurately conveyed to him both by hearing and feeling.

The outer groove 12 of the disc 8, when arranged with one peg, will, when the resonator is positioned in said groove, give the beat. Or, pegs for a single one beat rhythm, which it is desired to repeat several times, may be selectively positioned adjacent said groove 12.

From the foregoing description it will be seen that the improved selective rhythm sounder is both simple and novel, is accurate and efficient, is easily arranged and operated, and is an absolute means for stamping in a person's mind a certain rhythm.

What I claim as my invention is:

1. A selective rhythm sounder, comprising a grooved member adapted to be turned protruding members removably inserted therein adjacent the groove, and a sounding member positioned in said groove and engaged, upon movements of the grooved member, by said protruding members.

2. A selective rhythm sounder, comprising a member adapted to be turned and provided with a convolute track, protruding members removably inserted in said member in predetermined positions adjacent separated portions of the track of said turnable member, and a sounding member positionable in said track and engageable, upon movements of the turnable member, by said protruding members, to emit a certain rhythm.

3. A selective rhythm emitter, comprising a grooved rotatable member, a resonator adapted to track in the groove of said member, and engaging members removably inserted in said rotatable member adjacent portions of the groove and arranged to strike said resonator when the rotatable member is rotated.

4. A selective rhythm emitter, comprising a grooved rotatable member, a manually held resonator adapted to track in the groove of said member, and engaging members removably inserted in said rotatable member adjacent portions of the groove and arranged to strike said resonator when the rotatable member is rotated.

5. A selective rhythm emitter, comprising a grooved rotatable member, pegs removably inserted therein in predetermined positions adjacent the groove, and a resonator held within said groove in the path of said pegs to be engaged thereby upon movements of the rotatable member.

6. A selective rhythm emitter, comprising a rotatable disc having a groove in one surface thereof and angularly spaced apertures adjacent said groove, pegs removably inserted in selected apertures, and a resonator held within said groove in the path of said pegs to be engaged thereby upon rotation of the disc.

7. A selective rhythm emitter, comprising a rotatable disc having a convolute groove in one surface thereof and angularly separated radial lines of apertures, the apertures of each radial line being positioned adjacent different convolutions of the groove, pegs removably inserted in selected apertures, and a resonator held within said groove in the path of said pegs to be engaged thereby upon rotation of the disc.

8. A selective rhythm emitter, comprising a rotatable disc having one surface formed with an outer circular groove, an inner convolute groove, and separated radial lines of apertures with the apertures of each radial line being positioned adjacent the circular groove and different convolutions of the convolute groove, the adjacent radial lines of apertures being separated by angles of less than ninety degrees, pegs removably inserted in selected apertures, and a resonator held within said groove in the path of said pegs to be engaged thereby upon rotation of the disc.

9. A selective rhythm emitter, comprising a grooved rotatable disc, pegs removably inserted therein in predetermined positions adjacent the groove, and a manually manipulated resonator having a handle portion, a needle portion for lodgment in said groove, and a yieldable clapper positioned within the path of said pegs to be engaged thereby upon movements of the rotatable member.

10. A rhythm producing disc for a rotating mechainsm, having an elongated groove in one surface and angularly separated radial lines of apertures, with the apertures of each radial line positioned adjacent portions of said groove.

11. In combination, a disc rotating mechanism, a disc carried thereby, said disc having in one surface a convolute groove and angularly separated radial lines of apertures, the apertures of each radial line being positioned adjacent different convolutions of the groove, pegs removably insertable in any of said apertures, a resonator adapted to track in said groove and to be engaged by inserted pegs upon rotation of the disc, and means for locating pegs within certain apertures to produce a predetermined rhythm exemplified by certain selected note indicia for a musical beat.

In testimony whereof, I affix my signature.
WILLIAM OTTO MIESSNER.